# 3,097,146
PROCESS FOR LYCOPENE PRODUCTION
Earl J. Swarthout, Edwardsburg, Mich., assignor to Miles Laboratories, Inc., Elkhart, Ind., a corporation of Indiana
No Drawing. Filed June 30, 1961, Ser. No. 120,973
23 Claims. (Cl. 195—78)

This invention relates to a process for the production of lycopene.

Various carotenoids have been produced by the fermentation of suitable nutrient materials using organisms of the Mucorales family. For example, *Blakeslea trispora* and several organisms of tihs family have been found to be effective for this purpose. In most cases of recorded fermentation using Mucorales organisms for the production of carotenoids, the product has been a mixture of carotenes including alpha, beta and gamma carotene. Lycopene has not previously been reported among the pigments of *Blakeslea trispora*.

Lycopene, which has the empirical formula—

$$C_{40}H_{56}$$

and a molecular weight of 536.85, is an open-chain analogue of beta carotene and has the structural formula—

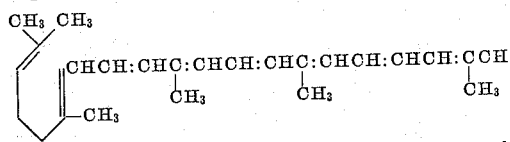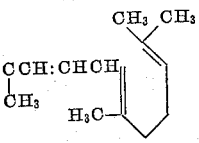

Lycopene is a carotenoid occurring in ripe fruit, especially tomatoes. One kilogram of fresh, ripe tomatoes yields 0.02 gram of lycopene. Its recovery from natural sources is therefore anything but economical. The commercial value of lycopene is to be found in its utility as an edible, oil soluble pigment. As a food coloring agent lycopene may be used to enhance the color of such foods as margarine, butter, salad oils, cake icings, beverages, soups and sausage casings.

It has now been found that lycopene may be produced by fermentation of suitable substrates under certain conditions. In this fermentation, under most favorable conditions, lycopene is produced practically to the exclusion of other carotenoids.

The fermentation process, which selectively results in the production of lycopene, consists of an aerobic fermentation either submerged or surface using a substrate composed of a mixture of types of nutrient materials.

One of these nutrient materials is a proteinaceous material. Numerous protein and protein derived materials may be used for this purpose. For example, materials derived from the byproducts of meat and fish processing including fish meal, fish solubles, meat extracts, tankage, animal stick liquors such as fish or mammal stick liquors and vegetable proteins such as those derived from corn, soybeans, wheat, cotton or yeasts are satisfactory protein nutrients as well as various other materials of similar nature and constitution.

The second part of the nutrient mixture is comprised of an energy furnishing nutrient; namely, a fat or fat derivative or a carbohydrate. As carbohydrates, there may be mentioned glucose, fructose, sucrose and various other sugars, as well as starch dextrins and the like. As fats, there may be used saturated as well as unsaturated fats and oils and various fatty acids or salts or esters thereof. Specifically, sodium acetate, oleic acid or glyceryl oleate may be used for this purpose. Mixtures of fats and carbohydrates may be used as well.

The proportions of the various nutrients which are necessary for satisfactory growth of the micro-organism with the commensurate production of lycopene are determined in accordance with the needs of the microorganisms and other reaction conditions which are utilized in the fermentation. The ratio of proteinaceous material to energy furnishing nutrient has not been found to be critical.

The amount of nutrient material is likewise dependent upon the nutritional requirements of the organism and somewhat upon the various other conditions of fermentation. The quantity can best be described as being a quantity of about from 5 grams to 100 grams per liter of fermentation medium.

A pH in the range of from about pH 6.6 to pH 9.5 has been found most favorable for production of lycopene. Particularly preferred is a pH within the aforementioned range which is above about pH 7. The optimum pH range for satisfactory operation of the process of this invention is all the more surprising in view of the prior art teachings of the use of pH values on the acidic side of the pH scale. Previously, the use of an alkaline pH has been believed to be detrimental to the growth of the Mucorales organisms and to the production of carotenoid pigments during the growth thereof.

The maintenance of a pH within the preferred range may be readily accomplished by controlled additions of suitable alkalizing agents at various points in the growth of the micro-organism and in the fermentation cycle. Particularly preferred is the use of sodium carbonate. Additions may be made by using the solid base or solutions thereof may be utilized if so desired. Various other agents may be used to control pH including NaOH, KOH, $NH_4OH$, $Ca(OH)_2$, $Na_3PO_4$, $Na_2HPO_4$, $NaH_2PO_4$, $K_2HPO_4$, $KH_2PO_4$, $NH_3$ and the like. Where the pH of the fermentation medium is between about pH 6.6 and pH 9.5 due to the presence of the constituents in the fermentation medium, it may be unnecessary to further adjust the pH so long as it remains in the desired range throughout the fermentation and particularly during the latter half of the fermentation cycle. The temperature of the fermentation medium is most advantageously maintained at about from 20° C. to 35° C. A temperature of about 27° C. has been found particularly satisfactory.

During the fermentation, which usually continues for about from four to seven days, the fermentation medium should be suitably aerated. This may be readily accomplished by bubbling air or oxygen through or over the fermenting medium. The rate of aeration is not at all critical and various aeration rates may be used depending on considerations of convenience and the equipment available.

The organisms to be used for the fermentation may be characterized as various single strains or mixtures of plus and minus strains of *Blakeslea trispora*, which is the preferred organism, although various other species of Mucorales could be used if desired. In particular, some of the strains of *Blakeslea trispora*, which have been found suitable for use in this fermentation, are NRRL 2546, 2547, 9159 and 9216. Various mixtures of the plus and minus strains of the organism may be utilized in the fermentation process of this invention.

This invention will be better understood by means of the following examples which are included for purposes of illustration and are not to be construed as in any way unduly limiting the scope of this invention which is defined in accordance with the claims appended hereto.

Example 1

A culture medium which contained per 100 ml., 1.4% concentrated fish stick liquor, 0.35% $K_2HPO_4$ and 2.5% calcium acetate and having an initial pH of 7.2, was inoculated with 0.5% (v./v.) of each of two strains of Blakeslea trispora [NRRL9216(+) and NRRL9159(−)]. The culture was placed on a shaker and rotated at 228 r.p.m. The temperature was held at 28° C. during the fermentation the pH rose from 7.2 to 8.37.

After four days, assay of the culture showed 5.65 mg. of lycopene per 100 ml. Spectrophotometric analysis showed absorption maxima in acetone at 510, 477 and 450 m$\mu$.

Example 2

Ten liters of a culture medium which contained 1.4% corn steep liquor, 0.55% $K_2HPO_4$, 4.4% glucose monohydrate, and 0.1% $CaCO_3$ having an initial pH of 7.2, was inoculated with 1.0% (v./v.) of each of two strains of Blakeslea trispora

[NRRL9216(+) and NRRL9159(−)]

The pH was maintained at 7.0 or above by additions of $Na_2CO_3$ to the medium during the fermentation.

The medium was agitated and aerated with 0.4 volume air per minute. The temperature was maintained at 27° C. After 7 days, spectrophotometric assay showed 9.97 mg. of lycopene per 100 ml. The absorption spectrum of the extracted pigment was typical of that of pure lycopene.

Example 3

One hundred thirty liters of a culture medium which contained 1.4% fish stick liquor, 0.35% $K_2HPO_4$, 4.4% glucose monohydrate and having an initial pH of 6.8 was inoculated with 1% (v./v.) of each of two strains of Blakeslea trispora

[NRRL9216(+) and NRRL9159(−)]

The pH was maintained at 6.6 or above by additions of $Na_2CO_3$ to the medium during the fermentation. The medium was agitated and aerated with 0.5 to 1.0 volume air per minute. The temperature was maintained at 27° C. After four days, spectrophotometric analysis showed 8.784 mg. of lycopene per 100 ml. The absorption spectrum of the extracted pigment was typical of that of pure lycopene.

Example 4

Ten liters of a culture medium which contained 1.4% fish stick liquor, 0.35% $K_2HPO_4$, 1.5% oleic acid and 2.2% glucose monohydrate and having an initial pH 6.8 was inoculated with 0.5% (v./v.) of each of two strains of Blakeslea trispora

[NRRL9216(+) and NRRL9159(−)]

The pH was maintained at 6.6 or above by additions of $Na_2CO_3$ to the medium during the fermentation. The medium was agitated and aerated with about 0.4 volume air per minute. The temperature was maintained at 27° C. to 28° C. After six days spectrophotometric assay showed 15.02 mg. of lycopene per 100 ml. Spectrophotometric analysis showed the typical lycopene absorption spectrum.

Example 5

Ten liters of a culture medium which contained 1.4% fish stick liquor, 4.4% glucose monohydrate and 0.35% $K_2HPO_4$ and having an initial pH of 7.08 was inoculated with 0.5% (v./v.) of each of two strains of Blakeslea trispora [NRRL9216(+) and NRRL9159(−)]. The pH was maintained at 7.0 or above by additions of KOH. The culture was agitated and aerated with approximately 0.4 volume air per minute. The temperature was maintained between 27° C. and 28° C. After four days spectrophotometric assay showed 3.32 mg. of lycopene per 100 ml. Spectrophotometric analysis showed the typical lycopene absorption spectrum.

Example 6

One hundred ml. of a culture medium which contained 1.5% corn steep liquor, 0.5% $K_2HPO_4$ and 4% oleic acid and having an initial pH of 7.2 was inoculated with 1.0% (v./v.) of each of two strains of Blakeslea trispora [NRRL9216(+) and NRRL9159(−)]. The culture was placed on a shaker and rotated at 228 r.p.m. The temperature was held at 28° C. During the fermentation the pH was held at 6.64. After four days, assay of the culture showed 3.0 mg. of lycopene per 100 ml. Spectrophotometric analysis of the culture showed other pigments present in addition to lycopene.

Example 7

The materials and procedures were identical with those of Example 1 except that 0.5% (v./v.) of a single strain of Blakeslea trispora [NRRL9159(−)] was employed as inoculum.

After four days, assay of the culture showed 1.8 mg. of lycopene per 100 ml. Spectrophotometric analysis showed the typical lycopene absorption spectrum.

Example 8

One hundred ml. of a culture medium which contained 0.5% peptone, 0.15% beef extract, 0.15% yeast extract, 0.1% dextrose, 0.35% NaCl, 0.37% $K_2HPO_4$, 0.132% $KH_2PO_4$ and 1% oleic acid and having an intial pH of 7.0 was inoculated with 5% (v./v.) of each of two strains of Blakeslea trispora

[NRRL2546(+) and NRRL2547(−)]

The culture was placed on a shaker and rotated at 228 r.p.m. The temperature was held at 28° C. After four days, 4 gm. dextrin was added to the culture.

After eight days, assay of the culture showed 8.2 mg. of lycopene per 100 ml. The absorption spectrum of the extracted pigment was typical of that of pure lycopene.

In summary, this invention is directed to a process for the production of lycopene by fermentation of a mixture of a proteinaceous nutrient and an energy producing nutrient with lycopene producing strains of Blakeslea trispora.

What is claimed is:

1. A process for the production of lycopene which comprises growing a strain of Blakeslea trispora in a fermentation medium consisting of a proteinaceous nutrient material and an energy furnishing nutrient material selected from the group consisting of fats, fat derivatives and carbohydrates at a pH of about from pH 6.6 to pH 9.5 and recovering the lycopene produced during the fermentation.

2. A process according to claim 1 wherein the pH of the fermentation is maintained at a pH greater than about pH 7 and less than about pH 9.5.

3. A process according to claim 1 wherein the pH of the fermentation is maintained within the range of about from pH 6.6 to pH 9.5 throughout the fermentation by means of controlled additions of an alkalizing agent.

4. A process according to claim 1 wherein the pH of the fermentation medium is maintained within the range of about from pH 6.6 to pH 9.5 throughout the fermentation by means of controlled additions of an alkalizing agent selected from the group consisting of ammonia, ammonium hydroxide, ammonium carbonate, ammonium phosphate, alkali metal hydroxides, alkali metal carbonates, alkali metal phosphates, alkaline earth metal hydroxides, alkaline earth metal carbonates and alkaline earth metal phosphates.

5. A process according to claim 1 wherein the temperature is maintained at about from 20° C. to 35° C. throughout the fermentation.

6. A process according to claim 1 wherein the temperature is maintained at about 27° C. throughout the fermentation.

7. A process according to claim 1 wherein said proteinaceous nutrient material is a material derived from the by-product of meat and fish processing.

8. A process according to claim 1 wherein the proteinaceous nutrient material is fish solubles.

9. A process according to claim 1 wherein the proteinaceous nutrient material is an animal stick liquor.

10. A process according to claim 1 wherein the proteinaceous nutrient material is corn steep liquor.

11. A process according to claim 1 wherein the proteinaceous nutrient material is peptone.

12. A process according to claim 1 wherein the proteinaceous nutrient material is beef extract.

13. A process according to claim 1 wherein the proteinaceous nutrient material is yeast extract.

14. A process according to claim 1 wherein the energy furnishing nutrient material is glucose.

15. A process according to claim 1 wherein the energy furnishing nutrient material is a fatty acid.

16. A process according to claim 1 wherein the energy furnishing nutrient material is oleic acid.

17. A process according to claim 1 wherein the energy furnishing nutrient material is starch.

18. A process according to claim 1 wherein the energy furnishing nutrient material is a material selected from the group consisting of acetic acid and salts of acetic acid.

19. A process according to claim 1 wherein the strain of Blakeslea trispora is selected from the group consisting of NRRL2546, NRRL2547, NRRL9159 and NRRL9216.

20. A process according to claim 1 wherein the strain of Blakeslea trispora is comprised of a mixture of plus and minus strains of Blakeslea trispora.

21. A process according to claim 1 wherein the strain of Blakeslea trispora comprises a mixture of strains NRRL9216(+) and NRRL9159(−).

22. A process according to claim 1 wherein the strain of Blakeslea trispora is NRRL9159(−).

23. A process according to claim 1 wherein the strain of Blakeslea trispora comprises a mixture of strains NRRL2546(+) and NRRL2547(−).

References Cited in the file of this patent

UNITED STATES PATENTS

| | | |
|---|---|---|
| 2,865,814 | Hesseltine et al. | Dec. 23, 1958 |
| 2,890,989 | Anderson | June 16, 1959 |